United States Patent [19]

Marino

[11] Patent Number: 4,623,757
[45] Date of Patent: Nov. 18, 1986

[54] METHOD AND APPARATUS FOR ELECTRONIC TOUCH MAPPING

[75] Inventor: Michael J. Marino, Lynn, Mass.

[73] Assignee: Interaction Systems, Inc., Newton, Mass.

[21] Appl. No.: 676,185

[22] Filed: Nov. 29, 1984

[51] Int. Cl.[4] .............................................. G08C 21/00
[52] U.S. Cl. ........................................ 178/18; 178/20
[58] Field of Search ............................. 178/18, 19, 20; 340/712, 706

[56] References Cited

U.S. PATENT DOCUMENTS

| | | | |
|---|---|---|---|
| 2,269,599 | 1/1942 | Moodey | 178/19 |
| 3,530,241 | 9/1970 | Ellis | 178/19 |
| 3,591,718 | 7/1971 | Asano et al. | 178/19 |
| 3,624,293 | 11/1971 | Baxter | 178/18 |
| 3,696,409 | 10/1972 | Braaten | 340/365 |
| 3,699,439 | 10/1972 | Turner | 324/71 |
| 3,758,718 | 9/1973 | Fletcher et al. | 178/18 |
| 3,772,684 | 11/1973 | Scantlin | 340/365 |
| 3,875,331 | 4/1975 | Hasenbalg | 178/19 |
| 3,906,190 | 9/1975 | Light | 235/61.6 |
| 3,959,585 | 5/1976 | Mattes et al. | 178/18 |
| 3,973,256 | 8/1976 | Stoesser et al. | 340/365 |
| 4,071,691 | 1/1978 | Pepper, Jr. | 178/19 |
| 4,079,194 | 3/1978 | Kley | 178/18 |
| 4,080,514 | 3/1978 | Pobgee | 178/18 |
| 4,110,749 | 8/1978 | Janko et al. | 340/365 |
| 4,129,747 | 12/1978 | Pepper, Jr. | 178/19 |
| 4,145,748 | 3/1979 | Eichelberger et al. | 364/862 |
| 4,157,539 | 6/1979 | Hunts et al. | 340/365 |
| 4,198,539 | 4/1980 | Pepper, Jr. | 178/18 |
| 4,198,623 | 3/1980 | Misek et al. | 340/365 |
| 4,293,734 | 10/1982 | Pepper, Jr. | 178/18 |
| 4,353,552 | 10/1982 | Pepper, Jr. | 273/85 |
| 4,371,746 | 2/1983 | Pepper, Jr. | 178/18 |
| 4,374,381 | 2/1983 | Ng et al. | 340/711 |
| 4,430,917 | 2/1984 | Pepper, Jr. | 84/1.01 |
| 4,476,463 | 10/1984 | Ng et al. | 340/712 |
| 4,523,654 | 6/1985 | Quayle et al. | 178/19 |

FOREIGN PATENT DOCUMENTS

US8000174 9/1980 PCT Int'l Appl. .

OTHER PUBLICATIONS

Elographics, Inc., TIX, Sep. 1, 1983.
Sierracin/Intrex Products, TransFlex, May 1, 1980.

Primary Examiner—Stafford D. Schreyer
Attorney, Agent, or Firm—Lahive & Cockfield

[57] ABSTRACT

Touch mapping method and apparatus locate a touch to an unpatterned and continuous layer of selected electrical conductivity in response to the incremental electrical charge which the conductive layer draws at one or more known positions, in response to electrical excitation, and relative to the charge which layer draws in the absence of the touch condition. The measurement of electrical charge provides touch location for a variety of touch impedances and other impedances coupled with the selectively conductive layer.

17 Claims, 4 Drawing Figures

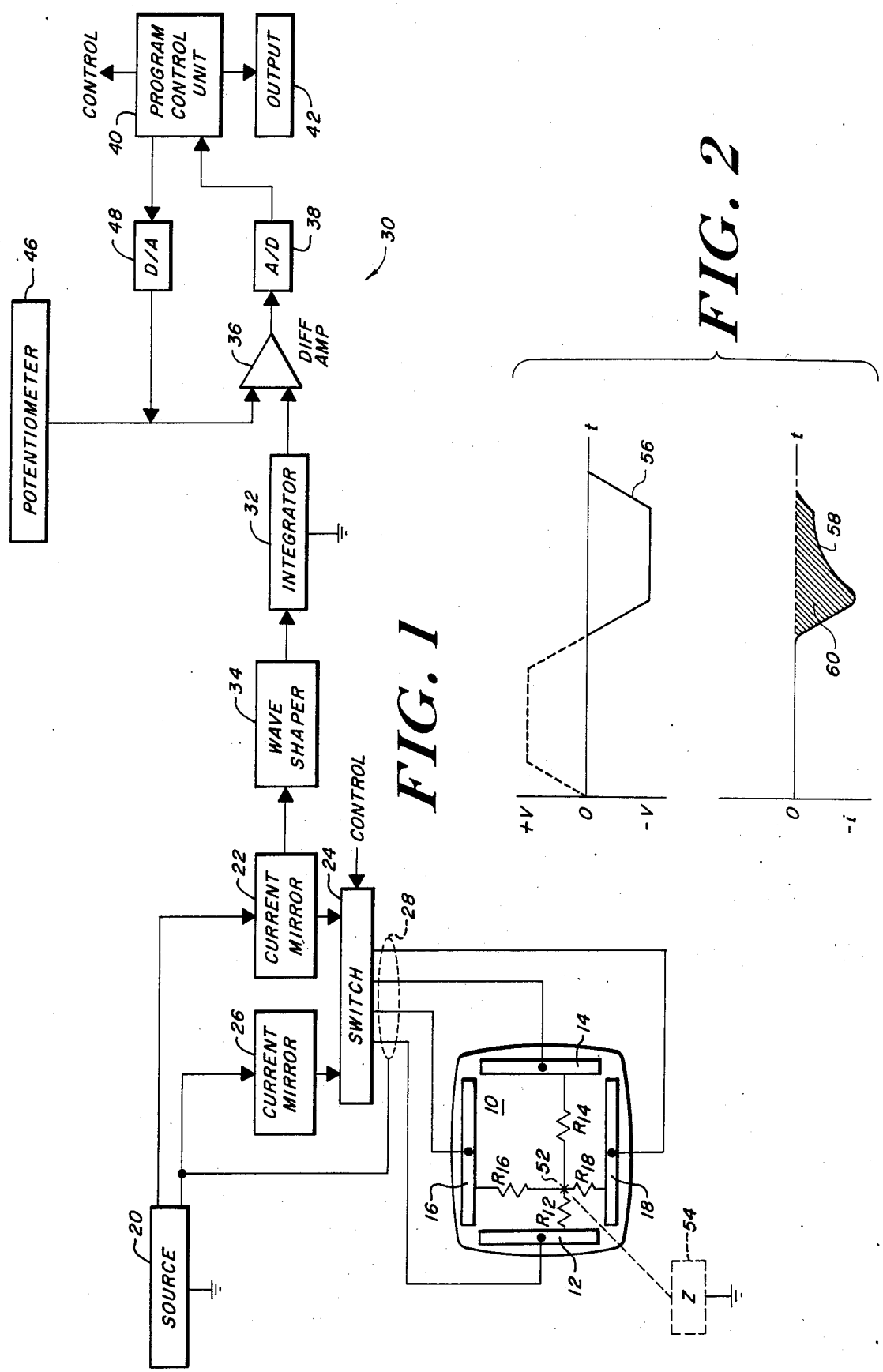

METHOD AND APPARATUS FOR ELECTRONIC TOUCH MAPPING

BACKGROUND

This invention relates to the art of electronically locating or otherwise mapping a touch to an input device. Examples of a touch-responsive input device with which the invention can be used include a touch screen on a video display terminal, a position indicator, a switch panel, and a touch tablet.

More particularly, the invention provides a method and apparatus for locating with an electronic circuit a touch to an unpatterned and selectively electrically conductive layer. The touch location which the invention provides has advantages in terms of accuracy and precision, and repeatability.

Video touch terminals with unpatterned screens are known, as described in U.S. Pat. No. 4,476,463. The unpatterned screen in principle can locate a touch anywhere, not just within the confines of a segmented or otherwise patterned screen.

The touch which can be mapped in the practice of the invention typically is a touch by a human finger. The invention can however be used to locate other touches, such as with an electrically conductive probe and, in another instance, a touch with an electrically active probe that introduces a measuring signal to the electrically conductive layer at the location of the touch. In general, a touch by a finger or passive probe couples an electrical shunt impedance to the selectively conductive layer. Both the location of the touch impedance on the layer, and the value of the impedance, are in general unknown. The location is the quantity which it is desired to measure. The measurement is complicated by the unknown value of the touch impedance. The touch generally presents a complex electrical impedance with an imaginary, capacitive component and with a real, resistive component. The magnitudes of both components can vary from touch to touch, particularly with a human touch, and can vary with environmental conditions such as temperature and humidity. These unknown and varying factors of a touch make it difficult to map the touch readily and accurately with known techniques.

Moreover, as the art of connecting a selectively conductive layer to a source advances, and provides more uniform electrical patterns on the layer, there is an increasing need to measure the effect of the touch impedance, and thereby to locate it, with accuracy, precision and repeatability. The co-pending and commonly assigned application for patent entitled "Method and Apparatus for Improved Touch Mapping Sensitivity", Ser. No. 676,186 filed concurrently herewith, describes such advances in connecting a source to the conductive layer.

Accordingly, an object to this invention is to provide a method and apparatus for electronically mapping a touch to an unpatterned and selectively electrically conductive layer and which are characterized by relatively high accuracy and precision.

Another object of this invention is to provide a method and apparatus for electronically locating a touch to an unpatterned and selectively electrically conductive layer and which provide substantially uniform accuracy and precision in response to a relatively wide variety of touch impedances.

Further objects of the invention are to provide a method and apparatus of the above character which are suitable for commercial implementation at relatively low cost.

Other objects of the invention are set forth hereinafter.

SUMMARY OF THE INVENTION

Touch location in accordance with the invention employs an unpatterned and selectively electrically conductive layer. The layer generally has a known conductivity property, typically measured in ohms per square. One prefered embodiment of the selectively conductive layer is an optically transparent resistive coating which overlies the screen of a cathode ray tube display terminal. In another embodiment the layer is part of a multi-layer system that provides electrical switch contact between two electrical layers that are normally isolated from each other, except at the point where the touch effects an electrical contact. Interaction Systems Inc. of Newtonville, Mass. markets terminals of the former type. Multi-layer systems of the latter type are commercially available from Sierracin Company of Chattsworth, California and from Elographics Inc. of Oak Ridge, Tennessee.

Further, the touch location is made with reference to at least a first coordinate, and is typically made with reference to at least one known location along a straight axis. In a more common practice, the location is made relative to two perpendicular axes in typical X-Y fashion, for locating the touch in a rectangular coordinate system.

A feature of touch mapping in accordance with the invention is that the location of a touch is determined in response to the electrical charge which the conductive layer draws from an electrical source in response to the touch. The electrical source can be coupled to the layer by connections at one or more fixed positions at the periphery or by a signal-injecting probe that effects the touch being mapped. Similarly, the electrical charge can be measured at one or more fixed positions or at the probe which produces the touch. In either case, the measurement of the electrical charge which the layer draws can provide a precise, accurate and repeatable touch location under a relatively wide range of touch impedances.

In a typical practice, measurements of the electrical charge which the conductive layer draws in response to the touch are made at two known locations, e.g., at two opposite peripheral locations, selected so that the touch is between them. The desired location of the touch is then determined with an arithmetic ratio function of the two charge measurements.

A further feature of the touch location in accordance with the invention is that the measurement is of the incremental charge which the conductive layer draws from an electrical source in the presence of the touch, relative to the charge which the layer draws in the absence of the touch.

A common practice of the invention further involves applying measuring signals to the conductive layer concurrently at two different positions, each known with reference to the selective coordinate scheme and which are spaced apart so that the touch being located is between them. The two signals are selected to minimize the charge which the layer draws at either position in the absence of the touch. The two signals generally are essentially equal and identical, and the charge which the layer draws in the absence of touch is essentially zero, aside from leakage and the system compensates for that. This practice facilitates measuring the incremental charge, for it then is simply the charge drawn in the presence of the touch.

A further feature of the touch location in accordance with the invention is that the measuring signal is a periodic time-varying or switched voltage with a known wave form. The desired measurement of electrical charge can be attained by a time integral of the current which the conductive layer draws in response to the applied voltage. The integration generally is made over several periods of the applied measuring signal to provide an accumulated and time averaged charge measurement. The measuring voltage preferably is clamped or otherwise returned to zero in each time period to allow the electrical potential on the conductive layer to discharge to a ground or other reference value.

Apparatus for one practice of touch mapping in accordance with the invention includes a source for applying electrical measuring signals to the conductive layer, and a device for measuring the incremental charge which the layer draws from the source in the presence of a touch. Either the source or the measuring device, or both, are coupled to the layer at least at one known position relative to which the touch is to be located. A current sensing device typically is provided to apply the measuring signal to the conductive layer and to develop a signal responsive to the source current which the layer draws. In a preferred form of the equipment, the sensing device is a Wilson current mirror type circuit. Further, there preferably are two such sensing devices connected with the electrical source to apply identical measuring signals concurrently to two locations on the conductive layer in a balanced arrangement which minimizes the effects of the current sensing devices. The two locations are selected so that the touch being located lies between them. The device for measuring charge receives, from at least one current mirror circuit, a signal responsive to the source current, and preferably includes an integrator for producing the desired output in response to electrical charge.

Yet another feature in accordance with the practice of the invention is that electrical shielding is provided to minimize unwanted perturbations in the measuring signal applied to the conductive layer, and in the signal monitored for measuring the electrical charge. The shielding preferably includes a shield on the connections between the current sensing devices and the conductive layer. The shield is connected to the measuring source and is electrically isolated from the sensed currents to provide an active electrical guard. Further shielding can be employed, including for the conductive layer itself.

These and other features of the invention described hereinbelow enable a touch to an unpatterned conductive layer to be located repeatedly with significant accuracy and precision. The practice of the invention significantly reduces the extent and frequency of the calibration required for the locating instrument. Other operational advantages of the invention are that it can locate a touch repeatedly with accuracy and precision for a relatively wide range of touch impedances, and over a large portion of the available display panel.

The invention accordingly comprises the several steps and the relation of one or more of such steps with respect to each of the others, and the apparatus embodying features of construction, combinations of elements, and arrangements of parts adapted to affect such steps, all as exemplified in the following detailed disclosure, and the scope of the invention is indicated in the claims.

BRIEF DESCRIPTION OF DRAWINGS

For a fuller understanding of the nature and objects of the invention, reference should be made to the following detailed description and the accompanying drawing, in which:

FIG. 1 is a block schematic diagram of a touch mapping system according to the invention;

FIG. 2 is a graph illustrating operation of the touch mapping system of FIG. 1;

DESCRIPTION OF ILLUSTRATED EMBODIMENTS

Figure 3:
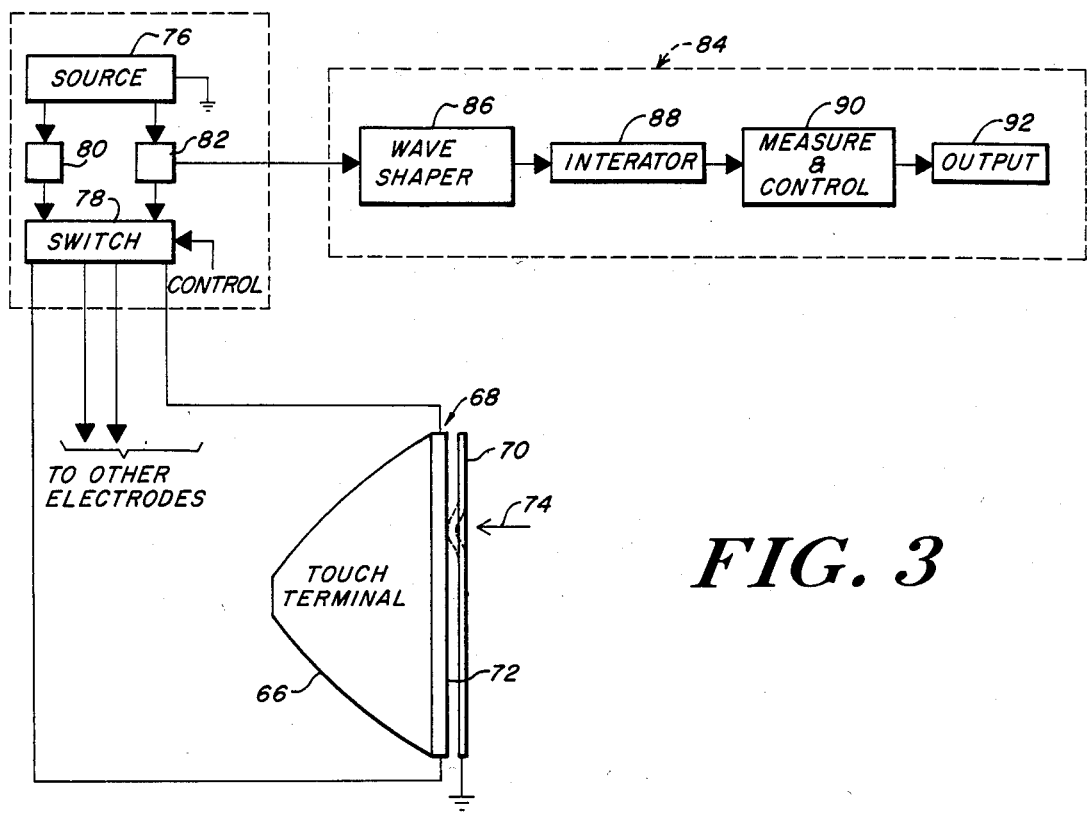
FIG. 3 is a block schematic representation of another touch mapping system embodying features of the invention.

FIG. 1 shows a touch locating system according to the invention which operates with a conductive touch layer 10 of selected electrical resistance and overlying the display screen of a cathode ray tube video display terminal. Four electrode networks 12, 14, 16 and 18, preferably as described in the above-referenced copending and commonly assigned application, connect to the electrical layer 10. The illustrated connections are made according to a two dimensional rectangular coordinate system, with electrode networks at the right, left, top and bottom peripheral edges of the conductive layer 10.

An electrical source 20 produces a pair of identical time varying periodic measuring voltages for application to the conductive layer 10 by way of the electrode networks. A Wilson-type current mirror circuit 22 applies one excitation voltage to one input of a double-pole double-throw switch 24, and a further, balancing current mirror circuit 26 applies the other measuring voltage to the other input of the switch 24. The four output terminals of the switch are connected to different ones of the electrode networks. The switch 24 can apply the two measuring voltages, from the current mirror circuits 22 and 26, to any pair of opposed electrode networks i.e. left/right, right/left, top/bottom and bottom/top.

The touch locating system of FIG. 1 also is illustrated as having a driven electrical shield, indicated with the dashed loop 28 enclosing the conductors that feed from the switch 24 to the electrode networks. The shield is connected to the same source voltage which the current mirror 26 receives. The conductors which connect to the electrode network accordingly are shielded from ground and from other conductors and noise sources with a shield that is driven with the same voltage that the conductors carry. This shielding minimizes the noise pickup in the interconnecting conductors, and minimizes the capacitive coupling between them and ground. The shield can be extended to protect other portions of the system, including the conductive layer.

The electrical current which the conductive layer 10 draws from the source voltage at any one electrode network, as determined with the switch 24, is coupled in the current mirror circuit 22 to an integrator 32, illustratively by way of a wave shaping circuit 34. The integrator and the wave shaping circuit are part of measuring unit 30. The wave shaping circuit typically includes an amplifier stage and filter stages. It can also include other wave shaping stages such as an inverter and a clamp stage. The integrator 32, which can employ a conventional series resistor and shunt compacitor, integrates the current wave form output from the wave shaper. The integrator accordingly produces an output signal responsive to the time integral of current and hence responsive to the electrical charge which the current mirror circuit 22 senses that an electrode network draws from the source. The integration can extend over a single period of the applied voltage or, as preferred to attain a larger charge signal, over many periods. The period of the source voltage and the duration of integration can be readily determined depending on the configuration of a particular system, including the configuration of the conductive layer, and on the electrical impedance of the touch being sensed.

The charge-responsive signal from the integrator 32 is measured, to determine the location of a touch to the conductive layer 10, with a differential amplifier 36, an analog to digital converter 38 that converts the amplifier output signal to digital format, and a program control unit 40. The program control unit, typically a digital microprocessor, computes a location determination in response to the charge-responsive signal and applies the resultant determination to an output device 42. The illustrated control unit also provides control signals for operating the switch 24. The output device may be a printer or other alphanumeric display device, or it may be a memory device for storing the location determination. In another illustrative instance, the output device is part of a data processing system that responds to the location determination to alter the display on the cathode ray tube terminal.

The illustrated differential amplifier 36 receives a second input signal selected to produce a null output signal when no touch is present at the conductive screen 10. The null signal is illustrated as provided with a potentiometer 46 that is manually adjustable to provide coarse nulling, together with a digital-to-analog converter 48 which the program control unit 40 drives to provide fine adjustment of the nulling signal input to the differential amplifier.

The operation of the touch locating system of FIG. 1 generally includes different sequences, including an optional calibrating sequence, a reference determining sequence and a measuring sequence. In one reference determining sequence, the conductive layer is untouched and the source excitation is applied to each pair of electrode networks, in turn. The potentiometer 46 is adjusted to set the differential amplifier output signal to zero for one electrode network. The program control unit 40 determines and stores the offset signal to apply to the D/A converter 48 for each electrode to obtain a null output signal from the amplifier 36 when that electrode is coupled with the measuring unit 30. The program control unit typically updates the four stored reference voltages periodically during intervals between measuring operations, and stores each offset value for application to the D/A converter 48 during the measuring operation.

The optional calibrating operation involves applying a touch to the conductive layer 10 at known locations thereon relative to the various electrode networks, and preparing a lookup table for equating the resultant measured charge-responsive signal from the A/D converter 38 with that screen location. The program control unit 40 typically stores this lookup table, just as it stores the offset voltages.

During these operations and during touch locating operations, the conductive layer 10 typically presents to the electrode networks 12, 14, 16 and 18 a complex electrical impedance having a real, resistive/conductive component and an imaginary, capacitive component. Further, when the switch 24 is set, for example, to apply measuring voltage by way of current mirror 22 to the top electrode network 16 and to apply measuring voltage by way of current mirror 26 to the bottom electrode network 18, the two electrode networks 16 and 18 are driven with identical in-phase voltages and there ideally is no potential difference between them. The output voltage from the differential amplifier 36 is adjusted to a null, essentially zero value in the absence of a touch to the conductive layer 10, when the only current the electrode network 16 draws is due to stray capacitances and other leakage. Note that when the switch 24 connects measuring voltages to the electrode networks 16 and 18, the other electrode networks 12 and 14 are essentially passive, in terms of not being connected to either the source 20 or to the integrator 32.

When, however, a touch is applied to the conductive layer 10, whether by a human finger or by another device presenting an electrical impedance, the touch impedance draws current from the layer 10 to ground. FIG. 1 illustrates such a touch at a location 52 on the screen and designates the touch as presenting an electrical impedance 54 to ground. The touch impedance 54 draws current from the source 20 at each electrode network 16 and 18. The current which the touch impedance draws from the electrode network 16, which at this instance is being energized through the current mirror 22, is coupled by way of that current mirror to the integrator 32 by way of the wave shaper 34.

The integrator in response produces an output signal corresponding to the electrical charge which the touch impedance 54 draws from the source voltage applied to the electrode network 16. The program control unit 40 responds to the resultant digital signal it receives from the amplifier 36 and converter 38, interrupts other operations, including reference updating, and processes the information to determine the relative location of the touch 52 from the top of the conductive screen 10, i.e., relative to the electrode network 16. The system of FIG. 1 preferably repeats this operation many times with a single setting of the switch 24 and thereby repeats and verifies each measurement made at the electrode network 16.

The system then changes the switch 24 to apply measuring voltage for example to the bottom electrode network 18 by way of the current mirror circuit 22. With that switch setting, the integrator produces an output signal responsive to the electrical charge which the conductive layer draws from the bottom electrode network 18 in response to the source voltage, and the program control unit 40 produces a resultant measure responsive to the location of the touch 52 relative to that electrode network 18. The program control unit 40 typically determines the location of the touch 52 relative to the up-down or top to bottom axis of the conductive layer 10 in response to the ratio of the electrical charge values measured from the opposed electrode networks 16 and 18. The ratio computation is one instance of an arithmatic proportional determination that determines the location of the touch in proportion to the distance between the opposed electrode networks 16 and 18, as controlled by the resistance of the layer 10.

More particularly, as further shown in FIG. 1, the illustrated resistive conductive layer 10 presents an electrical resistance R12, R14, R16 and R18 between the touch 52 and each electrode network 12, 14, 16 and 18, respectively. When the source 20 is applied, by the switch 24, to the top and bottom networks 16 and 18, the relative location of the touch between the locations of these electrode networks is proportional to the ratio of the resistances R16 and R18. Hence, a ratio of the measurements of the electrical charges which the touch impedance 54 draws through each such resistance will provide the desired location information relative to those electrode networks. In a preferred instance, the charge ratio is of form Q16/(Q16+Q18), where Q16 and Q18 are the measured charges at electrode networks 16 and 18 respectively. This ratio is linear with the distance of the touch from the bottom electrode 18, for a uniformly resistive conductive layer 10. The system of FIG. 1 can also locate a touch by a known impedance relative to a single electrode network by only one charge measurement. This single-location measurement generally is less precise than a location determined from two measurements, especially when made at opposite sides of the conductive layer.

The measuring system continues operation by applying source excitation to each of the other electrode networks 12 and 14 by way of the monitored current mirror 22, for determining the electrical charge which the touch impedance draws from the source 20 at each of these left and right electrode networks. In this manner, the control unit measures the charge drawn by the touch impedance at each electrode network and hence along both coordinates of the touch screen.

The measurement for locating the touch 52 is made in response to the electrical charge drawn from the source 20 at a given electrode network in order to account for both the resistive and the capacitive components of the touch impedance, and to account for these two components over a wide range of relative values of each. That is, a measurement of electrical charge is a measure of the time integral of the current which the touch impedance draws. The magnitude of the current at any instant is dependent in part on the real-imaginary nature of the touch impedance, because the current which the resistive portion draws typically differs in phase, often by an unknown amount from the current which the capacitive impedance portion draws. The time integral of the current which the integrator 32 determines, i.e., the electrical charge which the conductive layer draws from an electrode, provides a scalar measure of the two differently-phased current components essentially independently of the phase difference.

With further reference to FIG. 1, the excitation voltage which the source 20 applies to each current mirror circuit 22 and 26 is, as stated, preferably identical and has a time-varying repetative or periodic wave form. The wave form may be an alternating wave form, in which case the wave shaper 34 includes a rectifier stage so that the integrator 32 receives a unipolar current signal. The source excitation voltage preferably is clamped relative to ground to be symmetrical about ground when it has an alternating wave form and to be clamped to ground during a portion of each period when it is a unipotential voltage.

FIG. 2 illustrates one wave form 56 with which the system of FIG. 1 operates. The solid line showing of the wave form 56 is a time varying periodic unipolar voltage clamped between ground, i.e., zero volts, and a $-V$ value and having a finite rise time between the clamped values. Alternatively, the excitation can have an alternating wave form as further indicated with the dashed line portion which rises to a value of $+V$. The current which a touch screen layer 10 typically draws in response to the unipolar voltage 56, after being rectified as occurs in a Wilson current mirror circuit or as occurs in the wave shaper 34, is indicated in FIG. 2 with the wave form 58. The integrator 32 in essence produces an output signal corresponding to the area 60 within the wave form 58. The program control unit 40 responds to this measure, in the manner stated, for locating the touch relative to any one electrode network, relative to any pair of opposed electrode networks, or relative to the multicoordinate set of electrode networks.

The measuring system of FIG. 1 can include a second measuring unit—with wave shaper, integrator, potentiometer, differential amplifier and converters—connected with the current signal output from the other current mirror circuit 26. In this instance, the measuring system can measure concurrently the charge which the screen draws from two electrode networks. The second measuring unit can be connected with the program control unit 40 for this concurrent measuring operation. The switch 24 in this expanded touch locating system can be simplier, in that it needs to connect the two current mirrors 22 and 26 only to the opposed electrode network pair 12-14 and, alternatively, to the other pair 16-18, rather than requiring four sets of connections as in the system which FIG. 1 shows.

It will also be apparent that a more extensive measuring system can apply excitation to all four electrode networks directly, without a switch element 24, and can provide four measuring units which can operate concurrently or in whatever sequence the expanded control unit commands.

The measurement of electrical charge which the invention provides for locating and otherwise mapping a touch can be used with touch terminals other than that illustrated in FIG. 1, where a display device has a conductive layer 10 of selected resistive property and a touch to be detected applies to the conductive layer a shunt impedance to ground. One variation is to provide an electrically insulating protective layer over the conductive layer 10. Such a protective layer, which protects the conductive layer from scratches for example, introduces a capacitive impedance in series between the FIG. 1 touch impedance 54 and the conductive layer 10. The protective layer is preferably of uniform dielectric constant and thickness, so that the added capacitance it introduces is similar everywhere on the touch panel. The system operates in the same manner as described above, except for the predictable effect of the added capacitance of the protective layer.

FIG. 3 illustrates another touch mapping system in which a touch terminal 66 employs a touch responsive panel switch indicated generally at 68. The illustrated panel switch has a contact sheet 70, having a conductive inner surface, that overlies and is normally spaced from a conductive layer 72 of selected resistance which overlies the display panel of the touch terminal. The selectively electrically conductive layer 72 is similar to the conductive layer 10 of the embodiment of FIG. 1. A touch, as designated with the arrow 74, resiliently deflects the contact layer 70 to electrically connect, at the touch, the conductive inner layer to the resistive coating of the layer 72. The contact layer 70 is grounded, as illustrated. Hence the overlying contact layer 70 applies an electrical shunt impedance to ground to the conductive layer 72 at the location of the touch 74.

Thus, the embodiment of FIG. 3, is similar to the system of FIG. 1 except that the touch impedance 54 in FIG. 1 is replaced by a known electrical impedance which the contact layer 70 provides. It is only the location of the touch and not the magnitude or character of the touch impedance which is unknown in the system of FIG. 3. To locate the touch 74, the system of FIG. 3 employs, like the system of FIG. 1, a source 76 having two identically driven outputs that are connected to a switch 78 by way of separate current mirror type coupling circuits 80 and 82. The coupling devices and the switch apply the two source excitation voltages to opposed pairs of electrode networks connected with the selectively conductive layer 72, much in the same manner as described with reference to FIG. 1.

A signal responsive to the source current which is drawn from any one electrode network is applied, by way of the coupling device 82, to a charge responsive measuring unit 84 which is illustrated as having a wave shaping stage 86, a current integrator 88, a measuring and control stage 90 and ultimately an ouput device 92. The charge responsive unit 84 can operate in the same manner as the corresponding unit 30 in the system of FIG. 1. The system of FIG. 3, however, can operate with a constant measuring voltage. That is, since a touch to the panel switch 68 introduces a touch impedance that is essentially entirely resistive, the source 76 can provide a fixed d.c. voltage to each coupling device 80 and 82. In that instance, it is desirable to provide other means for periodically grounding or otherwise discharging accumulated potential from the conductive layer 72, at least between measurements at different electrode networks.

Figure 4:
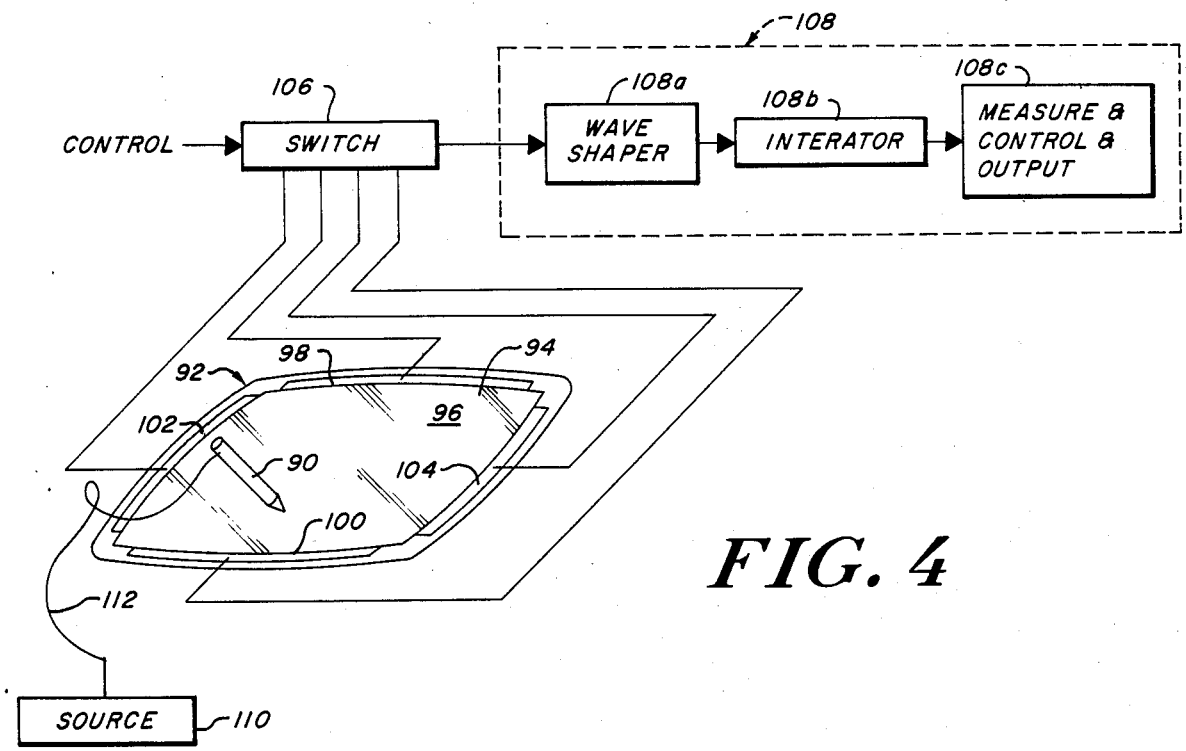
FIG. 4 is a block schematic representation of a touch mapping system according to the invention which utilizes a signal injecting touch probe.

FIG. 4 shows a touch mapping system which employs a signal introducing probe or stylus 90 for touching the screen of a touch terminal 92. The illustrated touch terminal 92 has a display panel or touch screen 94 and an optically transparent selectively resistive conductive coating 96 overlying the display screen. Pairs of opposed electrode networks 98, 100, 102 and 104 are electrically in contact with the conductive coating 96 at opposite edges along two axes of a rectangular coordinate system, and connect to a switch 106. The illustrated switch is essentially a single-pole four-position device which operates in response to a control input to connect the current signal which the conductive coating 96 draws at any one electrode network 98, 100, 102 and 104 to an integrating and measuring unit 108 similar to those described with reference to FIGS. 1 and 3.

The mapping system of FIG. 4 further employs an electrical source 110 that applies an excitation signal over a flexible cable 112 to the touch probe 90.

The operation of the mapping system of FIG. 4 for locating where the probe 90 is touching the display screen 94 involves applying the source current drawn from the probe 90 at each electrode network 98, 100, 102 and 104, one at a time, to the integrating and measuring unit 108. The wave form of the electrical excitation which the source 110 produces preferably is a switched or otherwise varying periodic clamped voltage as illustrated in FIG. 2 with the wave form 56. Other measuring wave forms, and a direct voltage, can be used, as those skilled in the art will appreciate. The integrating and measuring unit 108 integrates each current signal it receives, after passing through a wave shaping cirucitry 108a, with the integrating stage 108b, and applies a charge-responsive signal to the measure, control and output stage 108c. This charge-responsive output signal again provides advantages of minimal dependence on the relative portions of real and imaginary impedances which a touch couples to the conductive display screen coating 96.

The above-described and illustrated touch locating and other mapping systems that respond to the electrical charge in a selectively conductive layer, in the presence of a touch condition as contrasted to the electrical charge in the absence of the touch condition, provide accurate and precise touch mapping measurements with high consistency and repeatability under a variety of touch conditions. The touch mapping techniques described can be applied to a variety of touch terminals, as illustrated.

It will thus be seen that the invention efficiently attains the objects set forth above, among those made apparent from the preceding description. Since certain changes may be made in carrying out the above process and in the constructions set forth without departing from the scope of the invention, it is intended that all matter contained in the above description or shown in the accompanying drawings be interpreted as illustrative and not in a limiting sense. It is also to be understood that the following claims are intended to cover all the generic and the specific features of the invention herein described, and all statements of the scope of the invention which, as a matter of language, might be said to fall there between.

Having described the invention, what is claimed as new and secure by Letters Patent is:

1. In a method for mapping a touch to an unpatterned and selectively electrically conductive layer having a known conductivity property, wherein the mapping is relative to at least a first coordinate axis, the improvement comprising the steps of
   A. measuring an electrical charge which said layer draws over a selected time duration from an electrical signal source in response to the touch,
   B. applying at least one of a means for effecting said measurement and said source to said conductive layer at a first position relative to said coordinate, and
   C. determining said mapping of the touch relative to said first position in response to said charge measurement.

2. In a method according to claim 1, the further improvement comprising the steps of
   A. measuring at a second position relative to said coordinate axis electrical charge which said layer draws from said electrical signal source in response to the touch, where said first and second positions are selected so that the touch is between said first and second positions, and
   B. determining the mapping of the touch in response to an arithmetic ratio function of the measured electrical charges drawn at said first and second positions respectively.

3. In a method according to claim 1 the further improvement comprising the steps of
   A. coupling said electrical signal source to said conductive layer at the touch, and
   B. providing said first position at the periphery of said layer.

4. In a method according to claim 1 the further improvement comprising the step of
   A. coupling said electrical signal source to said conductive layer at the periphery of said layer.

5. In a method according to claim 1 the further improvement comprising the steps of
   A. coupling said electrical signal source to said conductive layer at said first position, and
   B. providing said first position at the periphery of said layer.

6. In a method according to claim 1 the further improvement wherein said measuring step includes measuring an incremental charge which said layer draws in the presence of said touch relative to a charge drawn in the absence of said touch.

7. In a method according to claim 1 the further improvement comprising the steps of
   A. clamping an electrical potential of the conductive layer to a known level at periodic intervals, and
   B. continuing said measurement of charge over plural ones of said periodic intervals.

8. In a method for mapping a touch to an unpatterned and selectively electrically conductive layer having a known conductivity per dimension, wherein the mapping is relative to at least a first coordinate axis, and including applying an electrical measuring signal to said layer, the improvement comprising the steps of
   A. measuring an incremental electrical charge which said layer draws over a selected time duration from said measuring signal in the presence of said touch, relative to a charge drawn over said time duration in the absence of said touch,
   B. applying at least one of said measuring signal and a means for effecting said charge measurement to said layer at a first position relative to said first coordinate, and
   C. determining said mapping of the touch relative to said first position in response to said charge measurement.

9. In a method according to claim 8 the further improvement comprising the steps of
   A. applying a first electrical measuring signal to said layer at said first position,
   B. applying concurrently a second electrical measuring signal to said layer at a second position relative to said first coordinate and spaced from said first position so that the touch being located is between said first and second positions relative to said first coordinate, and
   C. selecting said first and second measuring signals to attain a minimal charge drawn by said layer at said first position in the absence of said touch.

10. In a method according to claim 9 the further improvement wherein said first and second measuring signals are substantially identical.

11. In a method according to claim 8 the further improvement comprising the step of applying said measuring signal with a known periodic voltage wave-form.

12. In a method according to claim 9 the further improvement comprising the steps of
   A. measuring an incremental charge which said layer draws, at said second position from said source signal, in the presence of said touch relative to a charge drawn in the absence of said touch, and
   B. determining the location of the touch in response to an arithmetic ratio function of said incremental charges measured at said first and said second positions.

13. A method for locating a touch to an unpatterned and selectively electrically conductive layer having a known conductivity per dimension wherein the location is along a first axis, said method comprising the steps of
   A. applying to said conductive layer at a first location along said first axis a first measuring signal having a selected voltage,
   B. applying a second measuring signal having a selected voltage to said conductive layer at a second location spaced along said first axis from said first location so that the touch is between said first and second locations,
   C. measuring at each of said first and second locations an incremental electrical charge which the layer draws over a selected time duration from said first and second measuring signals in the presence of said touch, relative to the charge drawn over said time duration in the absence of said touch, and
   D. determining the relative location of the touch in response to a ratio function of said measures of incremental charge at said first and second locations.

14. A method according to claim 13 comprising the further steps of
   A. applying said first and second measuring signals concurrently,
   B. selecting said measuring signals to attain minimal electrical charge drawn at each of said first and second positions in the absence of a touch to said conductive layer.

15. A method according to claim 14 comprising the further step of
   A. selecting said first and second measuring signals to have identical time-varying periodic voltages having at least a first clamped value.

16. In apparatus for locating a touch to a touch panel having an unpatterned and selectively electrically conductive layer thereon with a known conductivity per dimension property and wherein the location is with reference to at least a first coordinate axis, said apparatus having the improvement comprising
   A. electrical source means for applying a known electrical source signal to said conductive layer,
   B. means for measuring an incremental charge which said layer draws over a selected time duration from said source means in the presence of the touch at at least a first position known with reference to said first coordinate and relative to which the touch is to be located, relative to a charge which the layer draws over a selected time duration from said source means at said first location in the absence of said touch, and
   C. means for determining the relative location of the touch in response to the measurement of incremental charge at at least said first position.

17. In apparatus according to claim 16 the further improvement comprising electrical current mirror circuitry connected with said source means and with said conductive layer and with said measuring means for applying said source signal to said conductive layer and for applying to said measuring means a current signal responsive to the current signal said conductive layer draws from said source means.

* * * * *